(12) United States Patent
Cassagne et al.

(10) Patent No.: US 11,139,777 B2
(45) Date of Patent: Oct. 5, 2021

(54) PHOTOVOLTAIC PANEL

(71) Applicant: TOTAL RENEWABLES, Courbevoie (FR)

(72) Inventors: Valerick Cassagne, Limours (FR); Jean Guillaume Lobjois, Diane-Capelle (FR); Frederic Leroy, Vincennes (FR)

(73) Assignee: TOTAL RENEWABLES, Courbevoie (FR)

( * ) Notice: Subject to any disclaimer, the term of this patent is extended or adjusted under 35 U.S.C. 154(b) by 0 days.

(21) Appl. No.: 16/626,710

(22) PCT Filed: Jun. 28, 2018

(86) PCT No.: PCT/EP2018/067478
§ 371 (c)(1),
(2) Date: Dec. 26, 2019

(87) PCT Pub. No.: WO2019/002501
PCT Pub. Date: Jan. 3, 2019

(65) Prior Publication Data
US 2020/0162017 A1 May 21, 2020

(30) Foreign Application Priority Data
Jun. 29, 2017 (FR) ...................................... 1756043

(51) Int. Cl.
*H02S 30/10* (2014.01)
*H02S 20/23* (2014.01)

(52) U.S. Cl.
CPC .............. *H02S 30/10* (2014.12); *H02S 20/23* (2014.12)

(58) Field of Classification Search
CPC ................................. H02S 30/10; H02S 20/23
See application file for complete search history.

(56) References Cited

U.S. PATENT DOCUMENTS

| | | | | |
|---|---|---|---|---|
| 2009/0320908 | A1* | 12/2009 | Botkin | F24S 25/20 136/251 |
| 2012/0260587 | A1* | 10/2012 | Pini | B32B 15/046 52/173.3 |
| 2014/0150843 | A1* | 6/2014 | Pearce | H01L 31/02 136/244 |
| 2016/0134231 | A1* | 5/2016 | Wu | C08L 23/16 136/251 |
| 2016/0315580 | A1* | 10/2016 | Patton | H01L 31/02 |
| 2016/0344339 | A1* | 11/2016 | Hsieh | H02S 30/20 |

FOREIGN PATENT DOCUMENTS

FR 3 043 840 A1 5/2017

OTHER PUBLICATIONS

International Search Report dated Sep. 21, 2018 in PCT/EP2018/067478 filed on Jun. 28, 2018, 2 pages.

* cited by examiner

*Primary Examiner* — Jayne L Mershon
(74) *Attorney, Agent, or Firm* — Oblon, McClelland, Maier & Neustadt, L.L.P.

(57) ABSTRACT

A photovoltaic panel is provided, including a plastic support sheet having a cellular core; a laminate of photovoltaic cells fixed to the support sheet; and a plastic and/or composite frame including longitudinal profile sections for laterally protecting the laminate of photovoltaic cells and the support sheet, and corner-shaped portions connecting the longitudinal profile sections together in order therewith to form a closed frame.

12 Claims, 3 Drawing Sheets

PHOTOVOLTAIC PANEL

Figure 1:
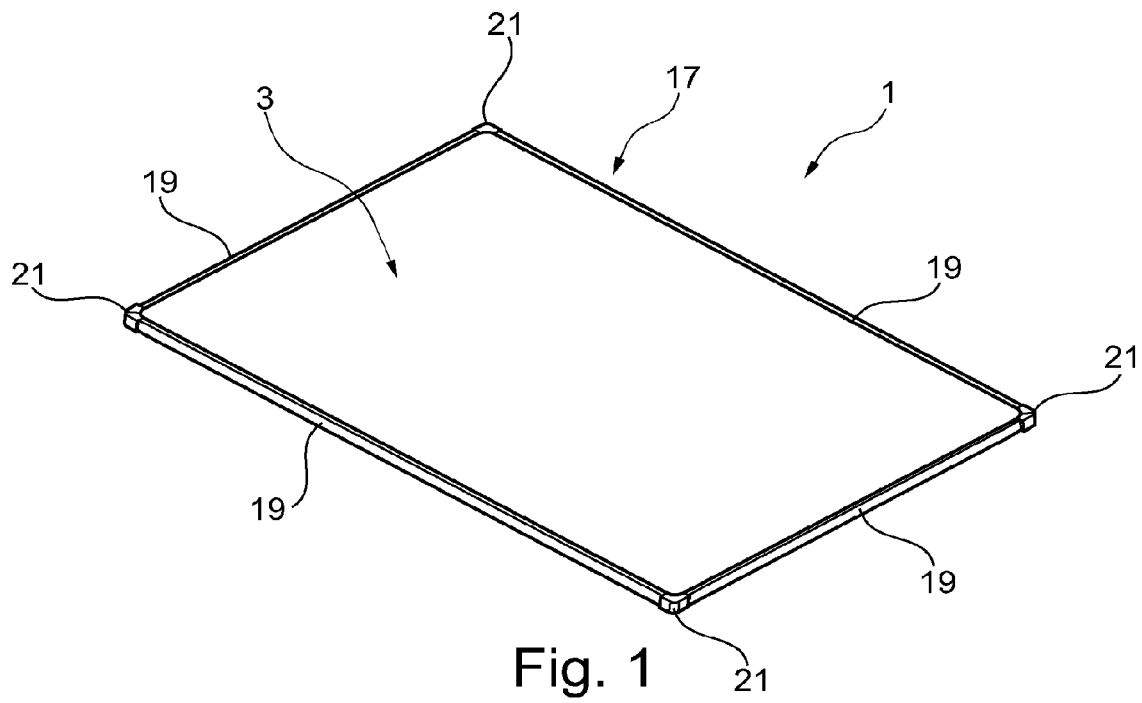

The present invention relates to a photovoltaic panel.

Photovoltaic solar panels make it possible to produce electrical energy from solar radiation. They comprise a plurality of photovoltaic elements (typically cells or thin layers) which operate according to the principle of the photoelectrical effect. Generally, several photovoltaic elements are linked to one another in a photovoltaic solar panel, and several panels are grouped together to form a solar installation. This installation produces electricity which can be consumed in situ or feed a distribution network.

For this, the photovoltaic solar panels are generally installed on roofs to be well exposed to the sun without requiring a footprint on the ground.

Among the roofs targeted for installation of the photovoltaic panels thereon, many roof surfaces of industrial or commercial buildings could be equipped with such solar panels. Indeed, for the operator of the building, the generation of electrical energy can create an additional revenue or a saving and contribute to promoting the economical operation of the building.

However, these commercial or industrial buildings are often constructed with, for example, a metal or wooden framework which is dimensioned to address simply the technical constraints in terms of loading to support the roof with an insulation as well as a snow loading for example depending on the region of construction.

Now, because of their weight, it is currently not possible to install certain solar panels on the roof of certain buildings without contravening the technical standards currently in force. Indeed, most of the known solar panels generally have a glass front face and a metal support frame, such that a single panel often weighs more than 20 kg, even 30 kg for some models. If, in addition, the support structures which are necessary to the installation of the photovoltaic panels are added in, the result is an additional loading of 15 kg/m2 or more for a roof.

Thus, the possibility of equipping large surface areas that are currently available with photovoltaic panels is lost, notably on old buildings because of their limited dimensioning in terms of loading.

For a new construction, planning for such a loading also represents an additional overhead in the construction which slows down the return on investment when wanting to equip its roof with solar panels.

The present invention therefore aims to propose photovoltaic panels that are lighter and which can be installed on roofs of industrial or commercial buildings by adding only a small excess weight thereon.

According to a different and independent objective, the present invention aims to propose photovoltaic panels whose assembly offers an optimized cost.

According to yet another different and independent objective, the present invention aims to propose photovoltaic panels whose installation can be facilitated and requires less wiring.

To this end, the subject of the invention is a photovoltaic panel comprising:
  a support sheet made of plastic material having a cellular core such as honeycombs,
  a laminate of photovoltaic cells fixed onto the support sheet,
  a frame made of plastic and/or composite material comprising
    longitudinal profiles for lateral protection of the laminate of photovoltaic cells and of the support sheet,
    corner-forming portions connecting said profiles to one another to form with them a closed frame.

By virtue of these features, it is possible to propose photovoltaic panels that are very light and robust.

Because the support sheet and the frame are made of plastic and/or composite material, the photovoltaic cells are naturally electrically insulated and no earthing connection is necessary, which facilitates the installation of the panels and offers a cost reduction in terms of earthing equipment and in time to install.

Because of the frame made of plastic and/or composite material, the rim part of the cellular core is well protected from external climatic conditions.

By providing a frame in several parts, the mounting of the panels is very rapid and accurate and problems of tolerances that parts of plastic material often exhibit are less of an issue and a seal-tightness of the assembly is thus guaranteed.

The photovoltaic panel according to the invention can comprise one or more of the following features taken alone or in combination:

According to one aspect, the cells of the support sheet can be honeycombs or cells of rectangular section extending parallel to the plane defined by the laminate.

The laminate of photovoltaic cells can be glued onto the support sheet, but a fixing by mechanical means, for example by clips, can also be envisaged.

Each longitudinal profile has, for example, in cross section, a general U shape whose branches are directed toward one another to exert a clamping force between the laminate and the support sheet.

The branches of the longitudinal profiles notably form an angle of between 5 and 15° with the bottom of the U.

The longitudinal profiles can be produced in composite material, in particular by being reinforced by glass fibers.

The longitudinal profiles comprise, for example, a polyester matrix.

The corner-forming portions have, in particular, an outer hollow facilitating the evacuation of water and of dirt.

According to one embodiment, the corner-forming portions have two right-angled profile sections and the outer hollow forms an angle of between 0° and 55°, notably of 45°, with respect to one of the two profile sections.

Each corner-forming portion has, for example level with the hollow, a small, generally L-shaped reinforcing plate whose ends serve as abutments for the longitudinal profiles during assembly.

The corner-forming portions can be produced in a single piece, notably by molding.

The support sheet has, in particular, a thickness of between 5 and 50 mm, more specifically 15 and 30 mm, and notably 20 mm.

According to one possible embodiment, the cellular core is covered on each side by a rigid skin reinforced by glass fibers.

One of the rigid skins can be covered with a sheet of plastic material to facilitate the gluing of the laminate of photovoltaic cells onto the support sheet.

The invention relates also to a method for assembling a photovoltaic panel as defined above, wherein:
  the laminate is fixed onto the support sheet,
  the longitudinal profiles are added onto the rims, and
  the corner-forming portions are then fixed.

Figure 2:
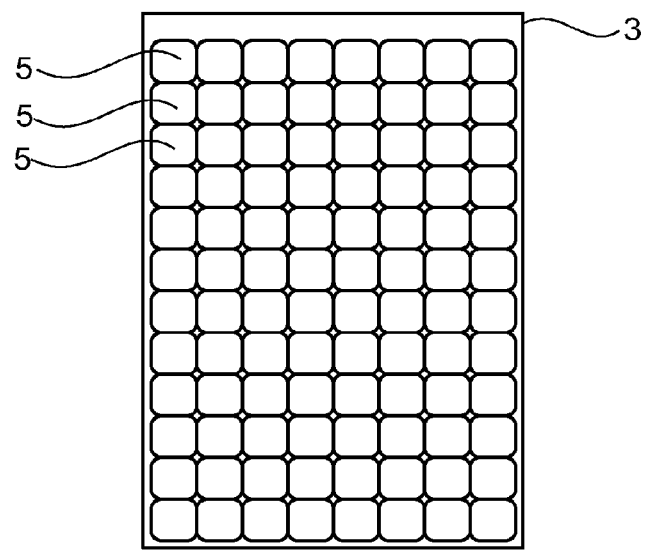
Figure 3A:
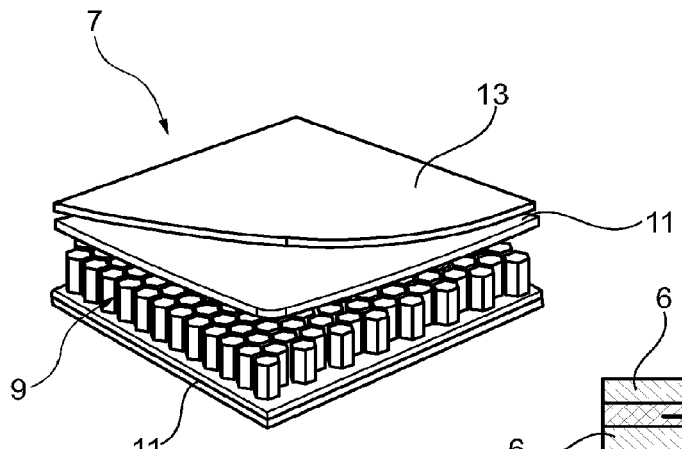
Figure 4:
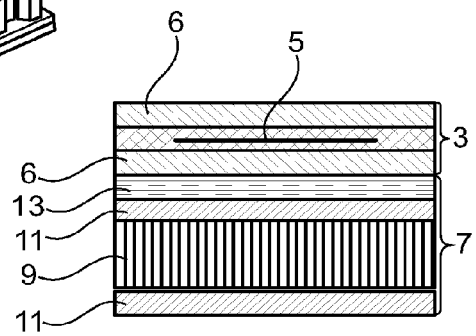
Figure 5:
Figure 6:
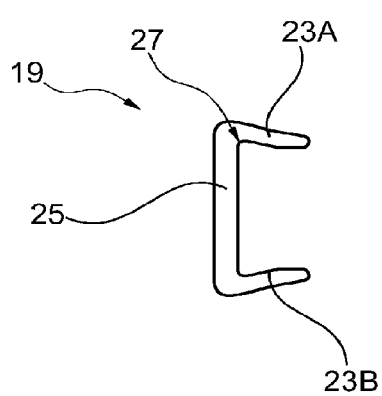
Figure 3B:
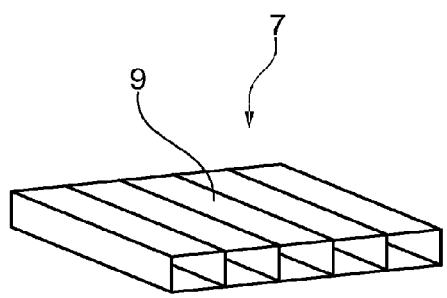
Figure 7:
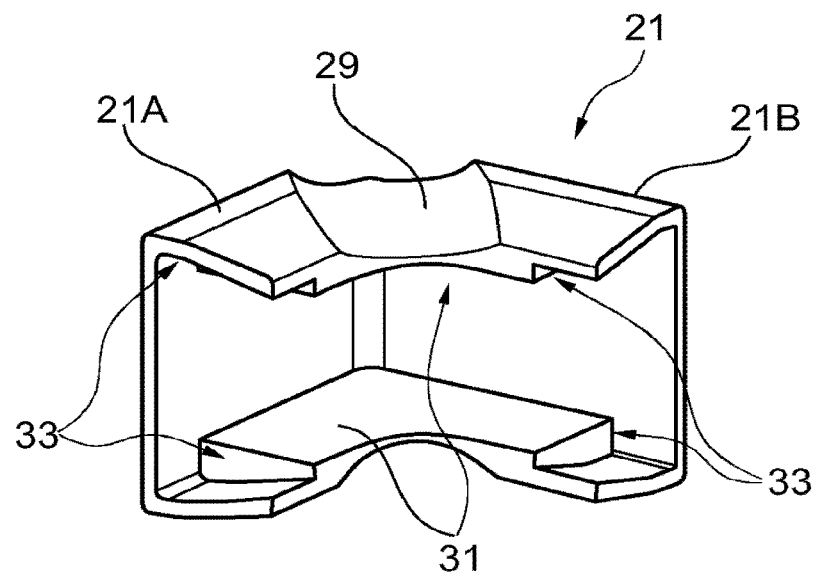
Figure 8:
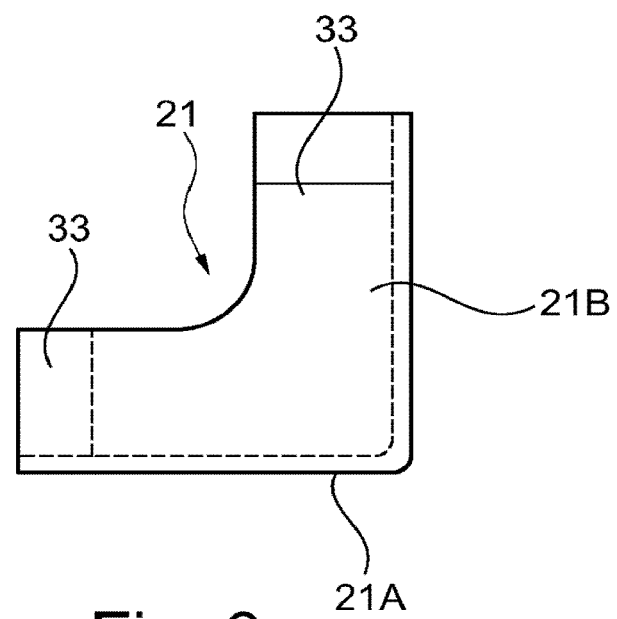

Other advantages and features will emerge on reading the description of the invention, and from the following figures in which:

FIG. 1 shows a photovoltaic panel according to the invention in the assembled state, FIG. 2 schematically shows, in plan view, a laminate of photovoltaic cells, FIG. 3A schematically shows, in perspective, a first example of a support sheet made of plastic material having a honeycomb core, FIG. 3B schematically shows, in perspective, a second example of a support sheet made of plastic material having a cellular core of rectangular sections, FIG. 4 shows, according to a simplified view, a transverse cross-sectional view of the laminate of photovoltaic cells glued onto the support sheet having a honeycomb core, FIG. 5 shows a simplified view in transverse cross section of the photovoltaic panel according to the invention, FIG. 6 is an enlarged cross-sectional view of FIG. 5 showing, in detail, a profile of the photovoltaic panel according to the invention, FIG. 7 shows, according to a perspective view, an example of a corner-forming portion that makes it possible to connect the longitudinal protection profiles, and FIG. 8 is a schematic plan view of a corner-forming portion of FIG. 7.

In the figures, the elements that are identical are identified by the same references.

The following embodiments are examples. Although the description refers to one or more embodiments, this does not necessarily mean that each reference relates to the same embodiment, or that the features apply only to a single embodiment. Simple features of different embodiments can also be combined to form other embodiments.

In the description, some elements or parameters may be indexed, such as, for example, first element or second element and first parameter and second parameter or even first criterion and second criterion, etc. In this case, a simple indexing is used to differentiate and designate elements or parameters or criteria that are similar but not identical. This indexing does not imply a priority of an element, parameter or criterion over another and such designations can easily be interchanged without departing from the scope of the present description.

"Composite" material is understood to mean an assembly of at least two components that are non-miscible (but that have a strong penetration capacity) and non-metallic whose properties complement one another. The new duly constituted material is electrically insulating and heterogeneous, has properties that the components on their own do not have.

A photovoltaic panel 1 according to the invention will be described with respect to FIGS. 1 to 8.

FIG. 1 shows a photovoltaic panel 1 in the assembled state. This photovoltaic panel comprises a laminate 3 of photovoltaic cells 5 (see FIG. 2).

A laminate 3 of photovoltaic cells 5 is well known in itself for example from the document FR 2 934 418. It notably involves photovoltaic cells 5 electrically connected to one another in a known manner and encapsulated between layers 6 of resin and/or of polymers which can possibly be reinforced, notably by woven or non-woven fabrics of glass fibers (see FIG. 4). The photovoltaic cells 5 are for example cells made of mono-crystalline silicon which allow for the greatest yield at the current time, but other types of photovoltaic cells can also be envisaged.

The laminate 3 of photovoltaic cells 5 is glued onto a support sheet 7 made of plastic material having a cellular core 9 notably in honeycomb form (see FIG. 3A) or in the form of cells of rectangular section (see FIG. 3B).

The support sheet 7 has, for example, a thickness of between 5 and 50 mm, more particularly 15 and 30 mm, notably 20 mm.

As can be seen in FIG. 3A, the honeycomb core 9 is covered on each side by a rigid skin 11 which can be reinforced by fibers, notably of glass. It is this structure which confers on the photovoltaic panel its rigidity while having a very low weight that can be supported by roofs of industrial buildings of low load-bearing capacity.

The advantage presented in the example of FIG. 3B is that the cells extend parallel to the plane defined by the laminate 3 and that there is no need for rigid skins 11 as in FIG. 3A. This makes it possible to further lighten the weight of the photovoltaic panel 1.

To facilitate the fixing according to the embodiment of FIGS. 3A and 4, for example by gluing, of the laminate 3 with the support sheet 7, the latter has, in addition, on one of the rigid skins 11, a sheet 13 of plastic material.

An example of the glue that can be used to fix the laminate 3 onto the support 7 is a polyurethane glue. Other fixing methods or materials can be used, such as the resins of the laminate 3 or hot welding or even mechanical fixing means such as clips.

To protect the rim 15, that is to say the lateral sides of the photovoltaic panel 1, the latter further comprises a frame 17 made of plastic and/or composite material.

This frame is directly assembled or added, notably by gluing, onto the assembled assembly formed by the laminate 3 and the support sheet 7.

This frame is formed by eight parts, namely four longitudinal profiles 19 for lateral protection of the laminate 3 of photovoltaic cells 5 and of the support sheet 7, and four corner-forming portions 21 connecting said profiles 19 to one another to form with them a closed frame.

As is shown in detail in FIG. 6, each longitudinal profile 19 has, in transverse cross section, a general U shape whose branches 23A and 23B are directed toward one another to exert a clamping force between the laminate 3 and the support sheet 7. The branches 23A and 23B form an angle of between 5 and 15° with the bottom 25 of the U.

In addition, a longitudinal pocket 27 is thus formed which can for example be filled with silicone to enhance the seal-tightness and to ensure the gluing of the profile 19 against the assembly formed by the laminate 3 and the support sheet 7.

According to one possible embodiment, the inside of the U of the longitudinal profile 19 is coated with silicone, then the longitudinal profile 19 is added onto the rim 15. During this assembly, the surplus silicone will be housed in the longitudinal pocket 27 and ensure, as noted above, the gluing and the seal-tightness.

To ensure a good mechanical strength, the longitudinal profiles 19 are produced in electrically insulating composite material, for example a polyester matrix, in particular reinforced by glass fibers. As an example, such a composite comprises 20% to 60% by weight of resin. The longitudinal profiles 19 are for example produced by extrusion, making it possible to have a particularly competitive production cost.

The corner-forming portions 21 are made of plastic material, notably of the same material as that of the longitudinal profiles 19. The corner-forming portions 21 can be produced in a single piece, notably by injection method.

The corner-forming portions 21 have two right-angled profile sections 21A and 21B.

According to a variant, provision is made to produce the corner-forming portions 21 in another material, in particular one that is more flexible (for example an elastomer) than the longitudinal profiles 19 to facilitate assembly.

In light of FIG. 7 showing a perspective view of a corner-forming portion 21, it can be seen that the latter has an outer hollow 29 forming a gutter and facilitating evacuation of water and of dirt when the solar panel is installed slightly inclined relative to the horizontal.

The outer hollow 29 forms, for example, an angle of between 0° and 55°, notably of 45°, with respect to one of the two profile sections 21A and 21B.

The corner-forming portions 21 have, in addition, level with the outer hollow 29, a small, generally L-shaped reinforcing plate 31 whose ends 33 can serve as abutments for the longitudinal profiles 19 during assembly.

It is therefore understood that the photovoltaic panel 1 according to the invention does not have surface metal parts so there is no longer a need to connect each photovoltaic panel to earth during installation, which is an important saving in terms of installation time, in terms of material costs for the earth-connecting cables and in terms of safety. That makes it possible to further lighten the installation on a roof of an industrial building for example.

The assembly of a photovoltaic panel is also very simple:
the laminate 3 is fixed onto the support sheet 7,
the longitudinal profiles 19 are added onto the rims 15, and
the corner-forming portions 21 are then fixed.

The last two steps can be performed consecutively or at the same time. In the latter case, the last two profiles equipped previously with the corners are fitted together.

A photovoltaic panel is thus obtained that is mechanically robust, but very light and easy and quick to install. As an example, the overall thickness of a panel according to the invention is approximately 30-35 mm and its weight is between 4 and 6 kg/m2, notably 4.7 kg/m2.

The invention claimed is:

1. A photovoltaic panel, comprising:
   a support sheet made of plastic material having a cellular core;
   a laminate of photovoltaic cells fixed onto the support sheet; and
   a frame made of plastic and/or composite material comprising
      longitudinal profiles configured for lateral protection of the laminate of photovoltaic cells and of the support sheet, and
      corner-forming portions connecting the longitudinal profiles to one another to form therewith a closed frame,
   wherein the corner-forming portions have an outer hollow configured to facilitate evacuation of water and dirt,
   wherein the corner-forming portions have two right-angled profile sections, and the outer hollow forms an angle of between 0° and 55° with respect to one of the two right-angled profile sections, and
   wherein each corner-forming portion has, level with the outer hollow, a small, generally L-shaped reinforcing plate whose ends serve as abutments for the longitudinal profiles during assembly.

2. The photovoltaic panel as claimed in claim 1, wherein cells of the support sheet are honeycombs.

3. The photovoltaic panel as claimed in claim 1, wherein the laminate of photovoltaic cells is glued onto the support sheet.

4. The photovoltaic panel as claimed in claim 1, wherein each longitudinal profile of the longitudinal profiles has, in cross section, a general U-shape having branches directed toward one another and configured to exert a clamping force between the laminate and the support sheet.

5. The photovoltaic panel as claimed in claim 1, wherein the longitudinal profiles are produced in composite material.

6. The photovoltaic panel as claimed in claim 5, wherein the longitudinal profiles are reinforced by glass fibers.

7. The photovoltaic panel as claimed in claim 5, wherein the longitudinal profiles comprise a polyester matrix.

8. The photovoltaic panel as claimed in claim 1, wherein the corner-forming portions are produced in a single piece.

9. The photovoltaic panel as claimed in claim 1, wherein the support sheet has a thickness of between 5 mm and 50 mm.

10. The photovoltaic panel as claimed in claim 1, wherein the cellular core is covered on each side by a rigid skin reinforced by glass fibers.

11. The photovoltaic panel as claimed in claim 10, wherein one of the rigid skins is covered with a sheet of plastic material configured to facilitate gluing of the laminate of photovoltaic cells onto the support sheet.

12. A method for assembling a photovoltaic panel as claimed in claim 1, comprising:
   fixing the laminate onto the support sheet;
   adding the longitudinal profiles onto rims; and
   fixing the corner-forming portions.

* * * * *